United States Patent
Wu et al.

(10) Patent No.: US 8,837,064 B1
(45) Date of Patent: Sep. 16, 2014

(54) SYSTEMS AND METHODS FOR QUALITY BASED BIT ERROR RATE PREDICTION

(71) Applicant: LSI Corporation, San Jose, CA (US)

(72) Inventors: Xuebin Wu, San Jose, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/853,749

(22) Filed: Mar. 29, 2013

Related U.S. Application Data (60) Provisional application No. 61/804,281, filed on Mar. 22, 2013.

(51) Int. Cl.
| | | |
|---|---|---|
| *G11B 27/36* | (2006.01) | |
| *G11B 5/035* | (2006.01) | |
| *G11B 20/10* | (2006.01) | |
| *G06F 11/07* | (2006.01) | |

(52) U.S. Cl.
CPC ...... *G06F 11/0751* (2013.01); *G11B 20/10379* (2013.01)
USPC .............................................. 360/31; 360/65

(58) Field of Classification Search
None
See application file for complete search history.

(56) References Cited

U.S. PATENT DOCUMENTS

| | | |
|---|---|---|
| 7,113,356 B1 | 9/2006 | Wu |
| 7,424,077 B2 | 9/2008 | Yang |
| 2003/0088834 A1 | 5/2003 | Murakami |
| 2006/0256670 A1 | 11/2006 | Park |
| 2011/0164669 A1 | 7/2011 | Mathew |
| 2013/0016846 A1 | 1/2013 | Tan et al. |
| 2013/0326316 A1* | 12/2013 | Wu et al. .................. 714/800 |
| 2014/0033001 A1* | 1/2014 | Zhang et al. .............. 714/805 |

OTHER PUBLICATIONS

U.S. Appl. No. 13/560,702, filed Jul. 27, 2012, Fan Zhang, Unpublished.
U.S. Appl. No. 13/445,848, filed Apr. 12, 2012, Bruce Wilson, Unpublished.
U.S. Appl. No. 13/340,974, filed Dec. 30, 2011, Dan Liu, Unpublished.
U.S. Appl. No. 13/316,953, filed Dec. 12, 2011, Haitao Xia, Unpublished.
U.S. Appl. No. 13/342,240, filed Jan. 3, 2012, Shaohua Yang, Unpublished.
U.S. Appl. No. 13/433,742, filed Mar. 29, 2012, Fan Zhang, Unpublished.
U.S. Appl. No. 13/251,342, filed Oct. 3, 2011, Haitao Xia, Unpublished.
U.S. Appl. No. 13/552,403, filed Jul. 18, 2012, Fan Zhang, Unpublished.
U.S. Appl. No. 13/798,638, filed Mar. 13, 2013, Fan Zhang, Unpublished.
U.S. Appl. No. 13/558,245, filed Jul. 25, 2012, Fan Zhang, Unpublished.
U.S. Appl. No. 13/597,026, filed Aug. 28, 2012, Fan Zhang, Unpublished.
U.S. Appl. No. 13/561,230, filed Jul. 30, 2012, Fan Zhang, Unpublished.
U.S. Appl. No. 13/602,463, filed Sep. 4, 2012, Fan Zhang, Unpublished.

(Continued)

*Primary Examiner* — Regina N Holder
(74) *Attorney, Agent, or Firm* — Hamilton DeSanctis & Cha (57) ABSTRACT

The present inventions are related to systems and methods for data processing, and more particularly to systems and methods for bit error rate prediction in a data processing system.

20 Claims, 6 Drawing Sheets

(56) References Cited

OTHER PUBLICATIONS

U.S. Appl. No. 13/602,535, filed Sep. 4, 2012, Fan Zhang, Unpublished.

U.S. Appl. No. 13/766,874, filed Feb. 14, 2013, Shaohua Yang, Unpublished.

U.S. Appl. No. 13/400,750, filed Feb. 21, 2012, Fan Zhang, Unpublished.

* cited by examiner

SYSTEMS AND METHODS FOR QUALITY BASED BIT ERROR RATE PREDICTION

CROSS REFERENCE TO RELATED APPLICATION

The present application claims priority to U.S. Pat. App. No. 61/804,281 entitled "Systems and Methods for Quality Based Bit Error Rate Prediction" and filed on Mar. 22, 2013 by Wu et al. The entirety of each of the aforementioned reference is incorporated herein by reference for all purposes.

FIELD OF THE INVENTION

The present inventions are related to systems and methods for data processing, and more particularly to systems and methods for bit error rate prediction in a data processing system.

BACKGROUND OF THE INVENTION

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. The inability to obtain the original data from the received data results in an error, with the overall errors being referred to as a bit error rate. Other than compilation of the errors at the end of processing, it is difficult to predict a bit error rate mid processing with a desired level of accuracy. This inability to predict makes mid processing adaptation difficult.

Hence, for at least the aforementioned reasons, there exists a need in the art for advanced systems and methods for data processing.

BRIEF SUMMARY OF THE INVENTION

Other embodiments of the present invention provide methods for data processing. The methods include applying a data detection algorithm to a data set to yield a detected output and an interim filtered output. The detected output includes soft data. The methods further include: calculating a variance across instances the interim filtered output, and calculating a bit error rate output by a quality based bit error rate prediction circuit based upon a combination of the variance and the soft data.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for priority based data processing.

Various embodiments of the present invention provide for data processing that includes predicting an expected bit error rate based upon a soft data quality metric. In some cases, the soft data is log likelihood ratio data that may be derived from either a data detector circuit or a data decoder circuit. As an example, a data processing system including circuitry for predicting an expected bit error rate based upon a soft data quality metric includes a data detector circuit that applies a data detection algorithm to a data input to yield a detected output, and a data decoder circuit that applies a data decode algorithm to a decoder input derived from the detected output to yield a decoded output. The decoded output includes soft data that is used to calculate the soft data quality metric. Calculating the soft data quality metric includes normalizing the soft data using a variance of a filter implemented as part of the data detector circuit. In some cases, this filter is a noise predictive filter. The soft data quality metric is used to calculate a predicted bit error rate. As another example, a data processing system including circuitry for predicting an expected bit error rate based upon a soft data quality metric includes a data detector circuit that applies a data detection algorithm to a data input to yield a detected output, and a data decoder circuit that applies a data decode algorithm to a decoder input derived from the detected output to yield a decoded output. The detected output includes soft data that is used to calculate the soft data quality metric. Again, calculating the soft data quality metric includes normalizing the soft data using a variance of a filter implemented as part of the data detector circuit. The soft data quality metric is used to calculate a predicted bit error rate.

Some embodiments of the present invention provide data processing systems that include: a data detector circuit, a variance calculation circuit, a data decoder circuit, and a quality based bit error rate prediction circuit. The data detector circuit is operable to apply a data detection algorithm to a data set to yield a detected output and an interim filtered output. The variance calculation circuit is operable to calculate a variance across instances the interim filtered output. The data decoder circuit is operable to apply a data decode algorithm to a decoder input derived from the detected output to yield a decoded output. The quality based bit error rate prediction circuit is operable to calculate a bit error rate output based upon a combination of the variance and a soft output. In some instances of the aforementioned embodiments, the soft output is soft data corresponding to the decoded output. In other instances, the soft output is soft data corresponding to the detected output.

In various instances of the aforementioned embodiments, the quality based bit error rate prediction circuit includes a threshold determination circuit operable to generate a threshold value corresponding to the variance. In some cases, the threshold determination circuit is a look up table programmed with threshold values corresponding to respective values of the variance.

In one or more instances of the aforementioned embodiments, the quality based bit error rate prediction circuit includes a counter circuit operable to increment whenever the soft output is less than a threshold value to yield a count value. In some such instances, the threshold value is an integer portion of an overall threshold value, the counter circuit is a first counter circuit, the count value is a first count value, and the quality based bit error rate prediction circuit includes: a summation circuit operable to add a value of one to the integer portion of the overall threshold value to yield an adjusted value, a second counter circuit operable to increment whenever the soft output is equal to the adjusted value to yield a second count value, and a multiplier circuit operable to multiply the second count value by a fraction portion of the overall threshold value to yield a product. In some particular cases, the summation circuit is a first summation circuit, and the quality based bit error rate prediction circuit includes a second summation circuit operable to add the first count value to the product to yield a low value count. In addition, a divider circuit may be included that is operable to divide the low value count by a total number of instances of the soft data.

Other embodiments of the present invention provide methods for data processing. The methods include applying a data detection algorithm to a data set to yield a detected output and an interim filtered output. The detected output includes soft data. The methods further include: calculating a variance across instances the interim filtered output, and calculating a bit error rate output by a quality based bit error rate prediction circuit based upon a combination of the variance and the soft data.

In some instances of the aforementioned embodiments, the methods further include: determining a threshold value based upon the variance, and incrementing a count value whenever the soft data is less than the threshold value. In some cases, determining the threshold value includes accessing a look up table using the variance. In various cases, the determined threshold value includes an integer portion of the determined threshold value and a fraction portion of the determined threshold value, the count value is a first count value, and the methods further include: adding a one to the integer portion of the determined threshold value to yield an adjusted value; incrementing a second count value whenever the soft data is equal to the adjusted value; multiplying the second count value by a fraction portion of the overall threshold value to yield a product; and adding the first count value to the product to yield a low value count.

Figure 1:
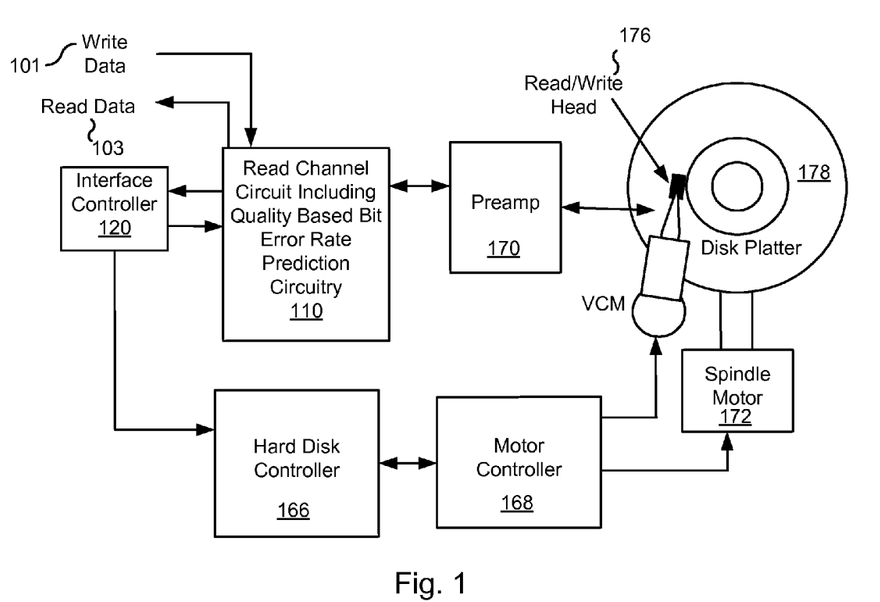
FIG. 1 shows a storage system including quality based bit error rate prediction circuitry in accordance with various embodiments of the present invention.

Turning to FIG. 1, a storage system 100 including a read channel circuit 110 having quality based priority scheduling circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of processing the received information, read channel circuit 110 utilizes quality based bit error rate prediction circuitry that provides a bit error rate output. In some cases, read channel circuit 110 may be implemented to include a data processing circuit similar to that discussed below in relation to FIG. 3. The bit error rate prediction circuitry may be implemented similar to that discussed below in relation to FIG. 4. Further, the data processing may be performed consistent with one of the approaches discussed below in relation to FIGS. 5a-5c.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
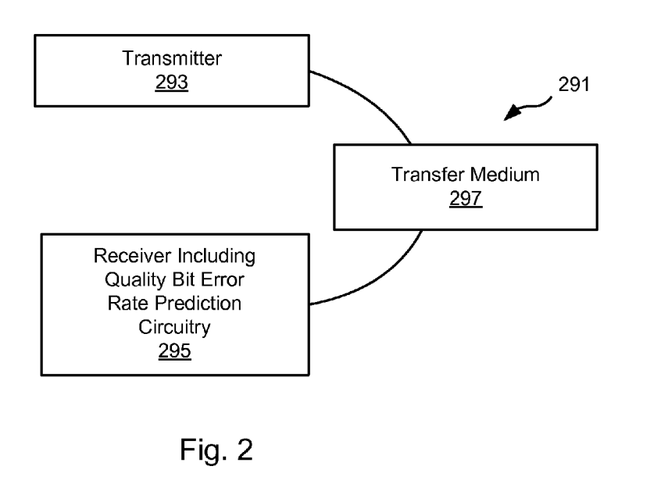
FIG. 2 depicts a data transmission system including quality based bit error rate prediction circuitry in accordance with one or more embodiments of the present invention.

Turning to FIG. 2, a data transmission system 291 including a receiver 295 having quality based priority scheduling circuitry is shown in accordance with various embodiments of the present invention. Data transmission system 291 includes a transmitter 293 that is operable to transmit encoded information via a transfer medium 297 as is known in the art. The encoded data is received from transfer medium 297 by a receiver 295. Receiver 295 processes the received input to yield the originally transmitted data. As part of processing the received information, receiver 295 utilizes quality based bit error rate prediction circuitry that provides a bit error rate output. In some cases, receiver 295 may be implemented to include a data processing circuit similar to that discussed below in relation to FIG. 3. The bit error rate prediction circuitry may be implemented similar to that discussed below in relation to FIG. 4. Further, the data processing may be performed consistent with one of the approaches discussed below in relation to FIGS. 5a-5c.

Figure 3:
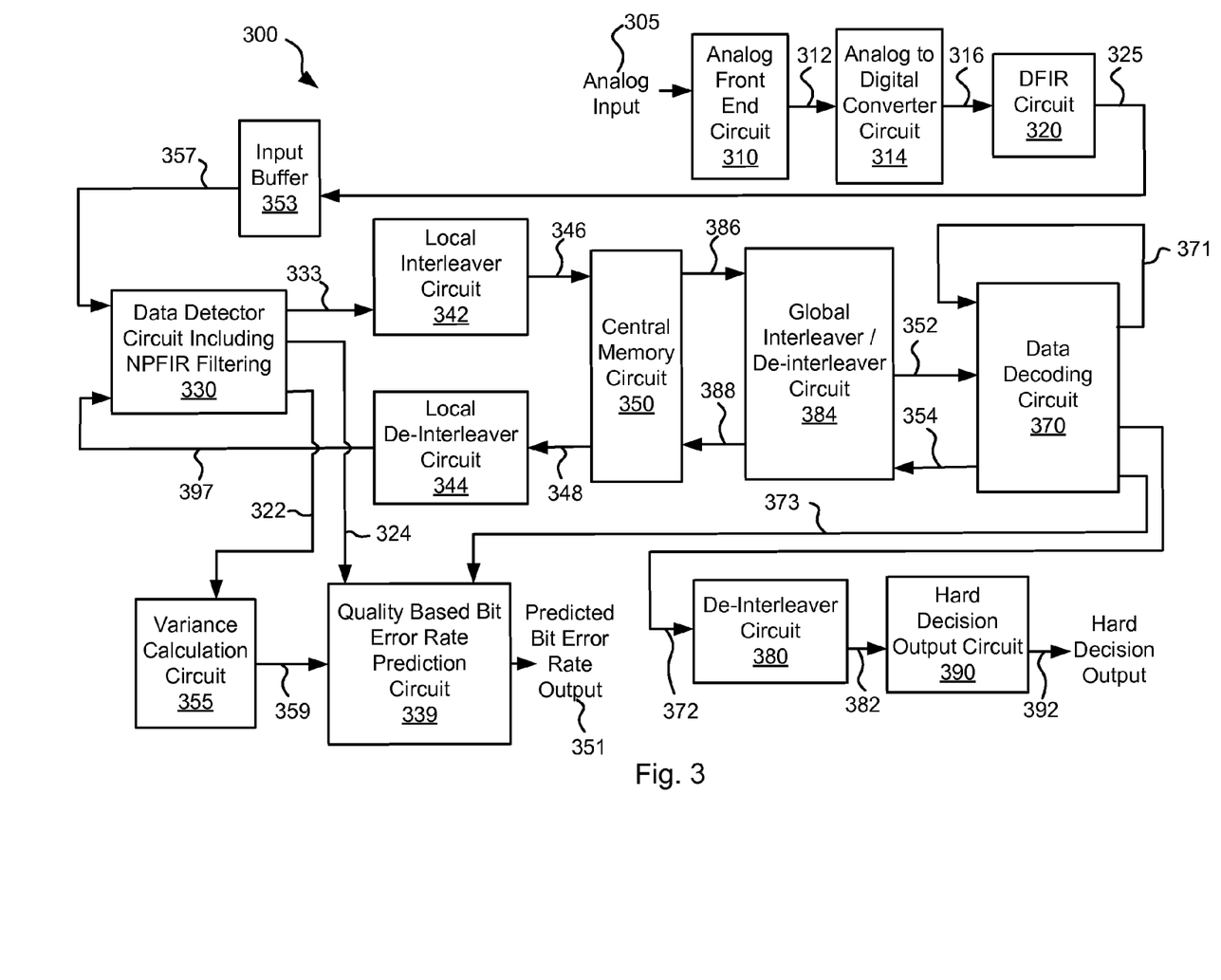
FIG. 3 shows a data processing circuit including a quality based bit error rate prediction circuit in accordance with some embodiments of the present invention.

FIG. 3 shows a data processing circuit 300 including a quality based bit error rate prediction circuit 339 in accordance with some embodiments of the present invention. Data processing circuit 300 includes an analog front end circuit 310 that receives an analog input 305. Analog front end circuit 310 processes analog input 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog input 305 is derived from a read/write head assembly (not shown) that is disposed in relation to a storage medium (not shown). In other cases, analog input 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. It may be possible that equalized output 325 may be received directly from a storage device in, for example, a solid state storage system. In such cases, analog front end circuit 310, analog to digital converter circuit 314 and equalizer circuit 320 may be eliminated where the data is received as a digital data input. Equalized output 325 is stored to an input buffer 353 that includes sufficient memory to maintain one or more codewords until processing of that codeword is completed through a data detector circuit 330 and a data decoding circuit 370 including, where warranted, multiple global iterations (passes through both data detector circuit 330 and data decoding circuit 370) and/or local iterations (passes through data decoding circuit 370 during a given global iteration). An output 357 is provided to data detector circuit 330.

Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a received codeword or data set. Data detector circuit 330 includes one or more noise predictive finite impulse response filters that provide interim filtered outputs to a Trellis based data detector circuit. In some embodiments of the present invention, data detector circuit 330 is a Viterbi algorithm data detector circuit including noise predictive filtering as are known in the art. In other embodiments of the present invention, data detector circuit 330 is a is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations.

Upon completion of application of the noise predictive filtering and the data detection algorithm to the received codeword on the first global iteration, data detector circuit 330 provides a detector output 333 and an interim filtered output 322. Detector output 333 includes soft data. As used herein, the phrase "soft data" is used in its broadest sense to mean reliability data with each instance of the reliability data indicating a likelihood that a corresponding bit position or group of bit positions has been correctly detected. A soft data output 324 corresponding to the soft data of detector data 333 is provided as an output. In some embodiments of the present invention, the soft data or reliability data is log likelihood ratio data as is known in the art. Detected output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Local interleaver circuit 342 may be any circuit known in the art that is capable of shuffling data sets to yield a re-arranged data set. Interleaved codeword 346 is stored to central memory circuit 350.

Once a data decoding circuit 370 is available, a previously stored interleaved codeword 346 is accessed from central memory circuit 350 as a stored codeword 386 and globally interleaved by a global interleaver/de-interleaver circuit 384. Global interleaver/De-interleaver circuit 384 may be any circuit known in the art that is capable of globally rearranging codewords. Global interleaver/De-interleaver circuit 384 provides a decoder input 352 into data decoding circuit 370. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 370 applies a data decode algorithm to decoder input 352 to yield a decoded output 371. In cases where another local iteration (i.e., another pass through data decoder circuit 370) is desired, data decoding circuit 370 re-applies the data decode algorithm to decoder input 352 guided by decoded output 371. This continues until either a maximum number of local iterations is exceeded or decoded output 371 converges. Similar to detected output 333, decoded output 371 includes both hard decisions and corresponding soft data. A soft data output 373 corresponding to the soft data of decoded output 371 is provided as an output.

Where decoded output 371 fails to converge (i.e., fails to yield the originally written data set) and a number of local iterations through data decoder circuit 370 exceeds a threshold, the resulting decoded output is provided as a decoded output 354 back to central memory circuit 350 where it is stored awaiting another global iteration through a data detector circuit included in data detector circuit 330. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 accessed from central memory circuit 350 and locally de-interleaved by a local de-interleaver circuit 344. Local de-interleaver circuit 344 re-arranges decoder output 348 to reverse the shuffling originally performed by local interleaver circuit 342. A resulting de-interleaved output 397 is provided to data detector circuit 330 where it is used to guide subsequent detection of a corresponding data set previously received as equalized output 325.

Alternatively, where the decoded output converges (i.e., yields the originally written data set), the resulting decoded output is provided as an output codeword 372 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order. The originally ordered data sets are then provided as a hard decision output 392.

As codewords are processed through data detector circuit 330, interim filtered output 322 is provided to a variance calculation circuit 355 that calculates a variance across a number of instances of interim filtered output 322 to yield a variance output 359. Variance calculation circuit 355 may be any circuit known in the art that is capable of receiving an input and calculating a variance of the input. In addition, soft data output 324 is provided to a quality based bit error prediction circuit 339.

Quality based bit error rate prediction circuit 339 calculates a predicted bit error rate output 351 based upon a combination of variance output 359 and soft data output 324. In particular, quality based bit error rate prediction circuit 339 calculates a threshold value as a function of variance output 359 in accordance with the following equation:

$$\text{Threshold} = f(\text{variance output } 359).$$

In one particular embodiment of the present invention, the function of variance output 359 is:

$$\text{Threshold} = 0.35(\text{variance output } 359).$$

In some cases, the function implemented by threshold look up table circuit 405 is a non-linear function. Based upon the disclosure provided herein, one of ordinary skill in the art will recognize other functions of the variance output that may be used in relation to different embodiments of the present invention.

Each instance of soft data output 324 is compared with the threshold, and where the instance is less than to equal to the threshold an integer count is incremented. In one particular embodiment of the present invention, the combination of determining the threshold and whether each instance of soft data 324 is less than the threshold is performed by a circuit implementing the function described in the following pseudocode:

```
For(i=0 to end) {
  If(soft data output324(i)<=f (variance output 359)* Fixed
      Threshold) {
    Increment Integer Count
  }
},
``` where i is a counter that counts the number of instances of soft data output 324 that are compared, and the fixed threshold is a default threshold value that is modified by multiplication by the function of variance output 359.

In addition, a non-integer portion (i.e., fractional part) of the calculated threshold value is used to interpolate across instances of soft data output 324 to yield an interpolated count in accordance with the following pseudocode:

```
For(i=0 to end){
    If(soft data output324(i)==Ceil(Threshold)) {
    Interpolated Count=Interpolated Count+fraction(Threshold))
    }
},
``` where the Ceil (Threshold) function is a ceiling adjusted value generated by adding a '1' to an integer threshold portion (i.e., rounding up to the next integer value) to yield a ceiling adjusted value. The interpolated count is then multiplied by the fractional portion of the threshold value (i.e., Fraction (Threshold)) and added to the integer count to yield a low value count. The low value count is divided by the total number of instances of soft data output 324 to yield a proxy of predicted bit error rate output 351. This proxy is provided to a look up table where it is converted to the actual predicted bit error rate.

As another example, quality based bit error rate prediction circuit 339 may operate consistent with the following pseudocode:

```
For(i=0 to end){
    If(soft data output324(i)<=Integer (Threshold)){
    Low Count A++
    I
    Else If(soft data output324(i)==Ceil(Threshold)){
    Low Count B++
    }
    Low Value Count=Low Count A+(Fraction (Threshold))*Low Count B
},
```

The low value count is divided by the total number of instances of soft data output 324 to yield a proxy of predicted bit error rate output 351. This proxy is provided to a look up table where it is converted to the actual predicted bit error rate.

Of note, the aforementioned operation of quality based bit error prediction circuit 339 uses soft data output 324. In other cases, the operation of quality based bit error rate prediction circuit 339 may use soft data output 373 in place of soft data output 324.

Figure 4:
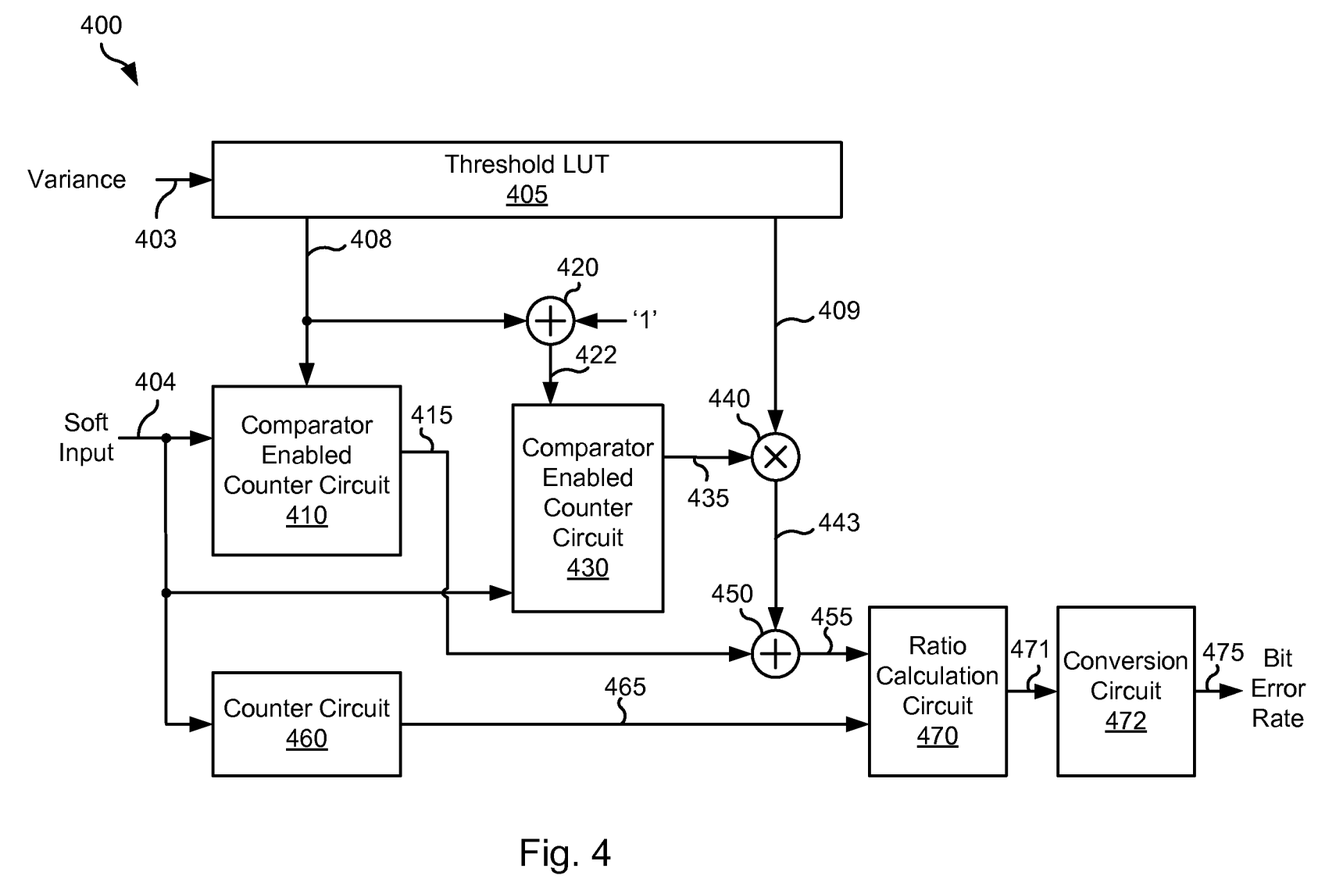
FIG. 4 shows an implementation of a quality based bit error rate prediction circuit in accordance with one or more embodiments of the present invention.

Turning to FIG. 4, an implementation of a quality based bit error rate prediction circuit 400 is shown in accordance with one or more embodiments of the present invention. Quality based bit error rate prediction circuit 400 may be used in place of quality based bit error rate prediction circuit 339 discussed above in relation to FIG. 3. Where quality based bit error rate prediction circuit 400 is used in place of quality based bit error rate prediction circuit 339, a variance 403 corresponds to variance 359, a soft input 404 corresponds to one of soft data output 324 or soft data output 373, and a bit error rate 475 corresponds to predicted bit error rate output 351.

As shown, variance 403 is applied to a threshold look up table (LUT) circuit 405. Threshold look up table (LUT) circuit 405 is programmed to include a number of threshold values that each correspond to respective values of variance 403. Threshold look up table circuit 405 provides a threshold value output in accordance with the following equation:

Threshold=$f$(variance output 403).

Such a look up table approach allows for simplified implementation of a function [f( )]. Such a function may be, for example, Threshold=0.35(variance output 403).

In some cases, the function implemented by threshold look up table circuit 405 is a non-linear function. Based upon the disclosure provided herein, one of ordinary skill in the art will recognize other functions of the variance output that may be used in relation to different embodiments of the present invention. The threshold value from threshold look up table circuit 405 includes an integer threshold portion 408 and a fractional threshold portion 409. Thus, as an example, where the threshold value from threshold look up table circuit 405 is 3.5, a value of 3 is provided as integer threshold portion 408 and a value of 0.5 is provided as fractional threshold portion 409.

Integer threshold portion 408 is provided to a comparator enabled counter circuit 410 that counts the number of instances of soft input 404 that are less than or equal to integer threshold portion 408. The resulting number of qualifying instances of soft input 404 is provided as an integer count value 415.

In addition, integer threshold portion 408 is provided to a summation circuit 420 that adds a '1' to integer threshold portion 408 to yield a ceiling adjusted value 422. This ceiling adjusted value corresponds to the Ceil(Threshold) function described above in relation to FIG. 3. Ceiling adjusted value 422 is provided to a comparator enabled counter circuit 430 that counts the number of instances of soft input 404 that are equal to ceiling adjusted value 422. The resulting number of qualifying instances of soft input 404 is provided as a ceiling count value 435. Ceiling count value 435 is provided to a multiplication circuit 440 where it is multiplied by fractional threshold portion 409 to yield an interpolated count value 443. Fractional threshold portion 409 corresponds to the fraction(Threshold) function described above in relation to FIG. 3.

Interpolated count value 443 and integer count value 415 are added together by a summation circuit 450 to yield a low count value 455. A counter circuit 460 counts the total number of instances of soft input 404 that are received, and the count is provided as a total count value 465. Total count value 465 and low count value 455 are provided to a ratio calculation circuit 470. Ratio calculation circuit 470 divides low count value 455 by total count value 465 to yield a proxy 471. Proxy 471 is provided to a conversion circuit 472 where it is mapped to yield a bit error rate 475. In some embodiments of the present invention, conversion circuit 472 is a look up table. As one example, the look up table may map proxies 471 provided from ratio calculation circuit 470 to bit error rate 475. In other embodiments of the present invention, conversion circuit 472 is a function circuit operable to implement a conversion function in accordance with the following equation:

Bit error rate 475=$f$(proxy 471).

In one particular embodiment, the function circuit implements the following function:

Bit error rate 475=0.4*(proxy 471).

Figure 5A:
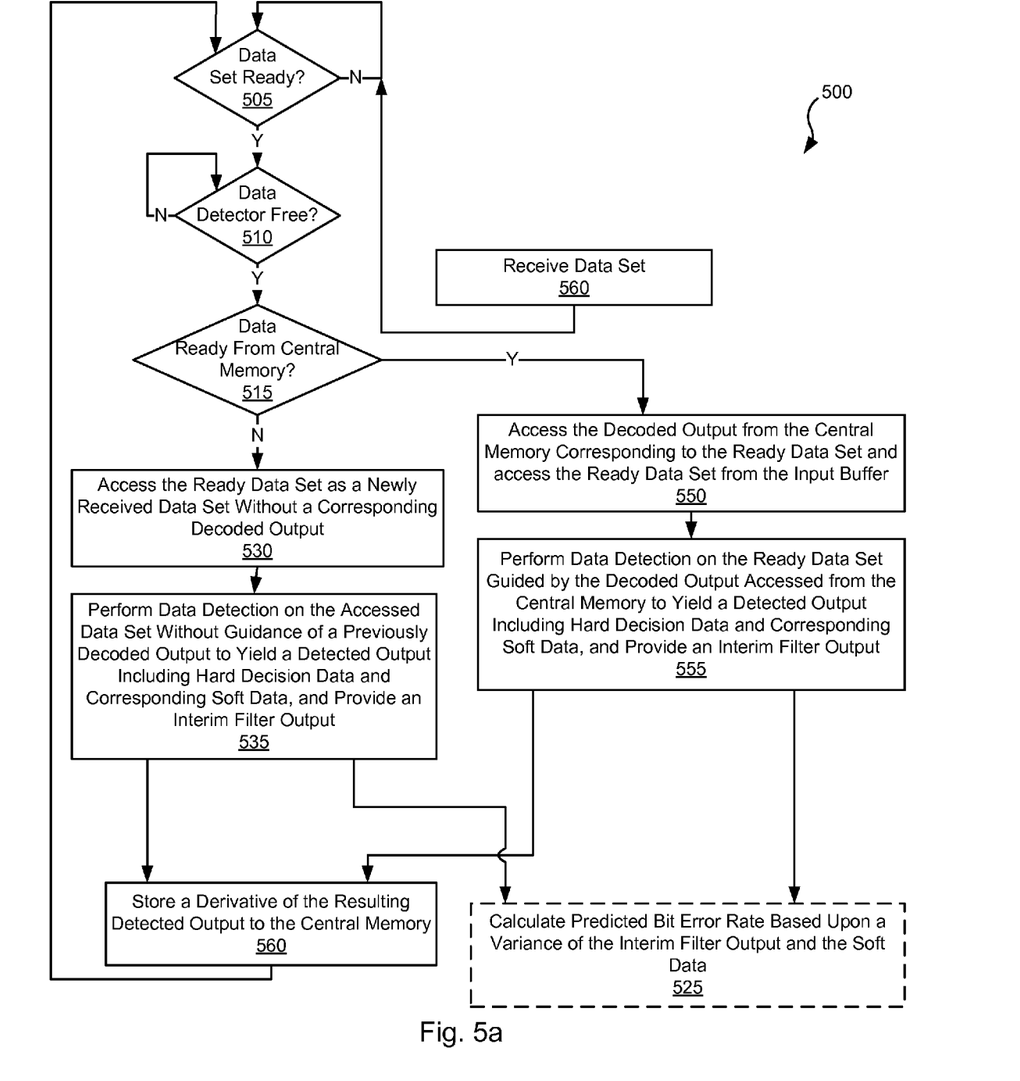
FIGS. 5a-5c are flow diagrams showing a method for data processing including quality based quality based bit error rate prediction in accordance with some embodiments of the present invention.

Turning to FIG. 5a, a flow diagram 500 shows a method for data processing including quality based quality based bit error rate prediction in accordance with some embodiments of the present invention. Following flow diagram 500, a data set is received (block 560). This data set may be derived, for example, from a storage medium or a communication medium. As the data set is received, a detect quality metric is calculated for the data set (block 465). It is repeatedly determined whether a data set is ready for processing (block 505). A data set may become ready for processing where either the data set was previously processed and a data decode has completed in relation to the data set and the respective decoded output is available in a central memory, or where a previously unprocessed data set becomes available in the input buffer. Where a data set is ready (block 505), it is determined whether a data detector circuit is available to process the data set (block 510).

Where the data detector circuit is available for processing (block 510), it is determined whether there is a decoded output in the central memory that is ready for additional processing (block 515). Where there is not a decoded output in the central memory (block 515), the ready data set is accessed from an input buffer as a newly received data set without a corresponding decoded output (block 530). A data detection algorithm is applied to the newly received data set (i.e., the first global iteration of the data set) without guidance of a previously decoded output to yield a detected output (block 535). The detected output includes hard decision data an corresponding soft data. In some cases, the soft data is log likelihood ratio data. In addition, an interim filter output is provided. The interim filter output is provided by a noise predictive filter circuit used in relation to applying the data detection algorithm as is known in the art. In some cases, the data detection algorithm is a Viterbi algorithm data detector circuit or a maximum a posteriori data detector circuit. A derivative of the detected output is stored to the central memory (block 560). The derivative of the detected output may be, for example, an interleaved or shuffled version of the detected output. In addition, a predicted bit error rate is calculated based upon a variance of the interim filter output and the soft data (block 525). Block 525 is shown in dashed lines as it is represented in more detail in FIG. 5b which is discussed in more detail below.

Alternatively, where a decoded output is available in the central memory and ready for additional processing (bock 515), the decoded output corresponding to the ready data set is accessed from the central memory and the ready data set is accessed from the input buffer (block 550). A data detection algorithm is applied to the data set (i.e., the second or later global iteration of the data set) using the accessed decoded output as guidance to yield a detected output (block 555). The detected output includes hard decision data an corresponding soft data. Again, in some cases, the soft data is log likelihood ratio data. In addition, an interim filter output is provided. Again, the interim filter output is provided by a noise predictive filter circuit used in relation to applying the data detection algorithm as is known in the art. A derivative of the detected output is stored to the central memory (block 560). In addition, a predicted bit error rate is calculated based upon a variance of the interim filter output and the soft data (block 525).

Figure 5B:
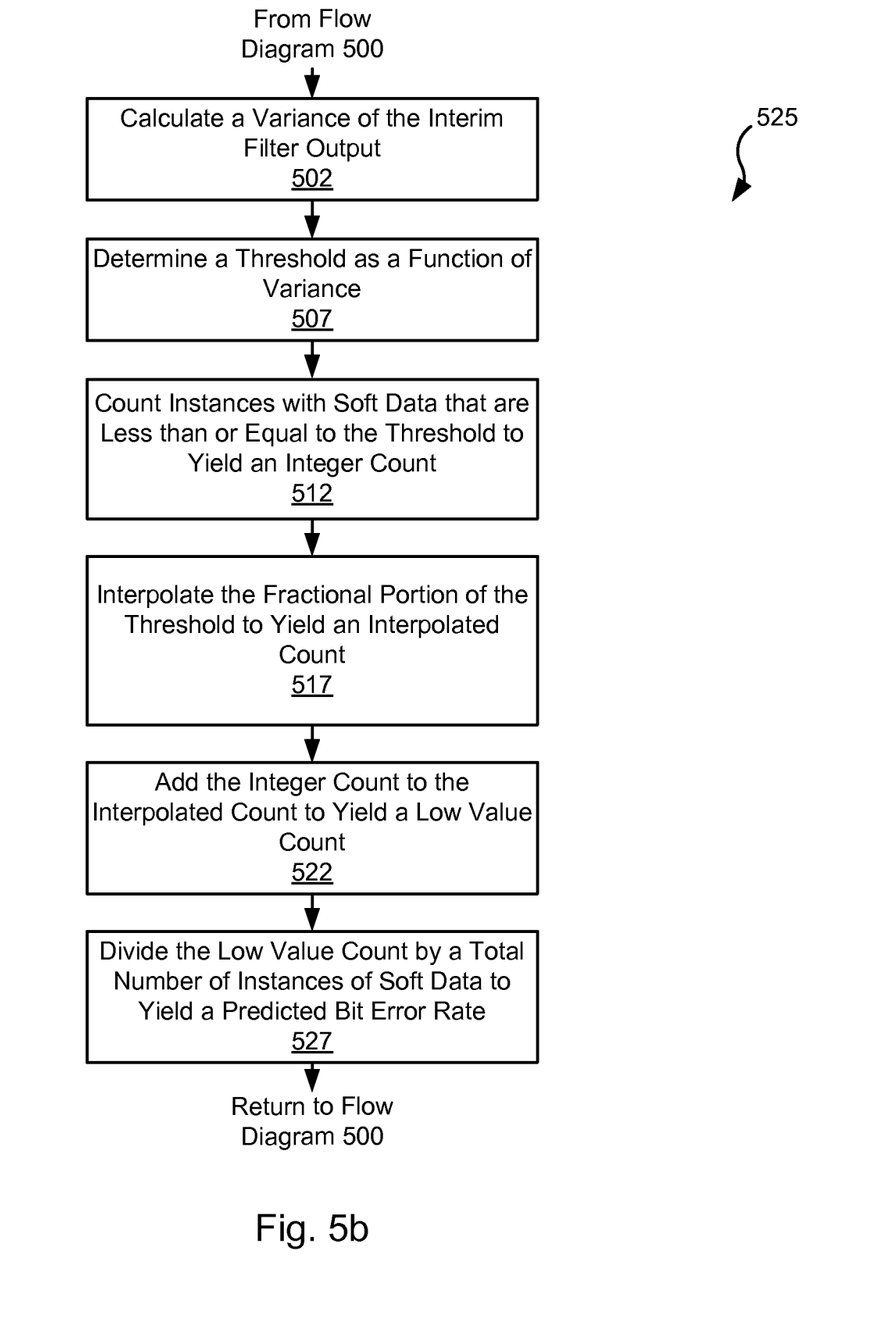

Turning to FIG. 5b, a flow diagram 525 shows the processes of the block of the same number (i.e., block 525) in flow diagram 500. Following flow diagram 525, a variance of the interim filter output is calculated (block 502), and a threshold is determined as a function of variance (block 507). The threshold maybe calculated in accordance with the following equation:

Threshold=$f$(variance).

In some cases, determining the threshold is calculated directly. In other cases, a look up table of predefined values of the threshold for corresponding values of the variance. Such a look up table approach allows for simplified circuitry and/or implementation of a non-linear function.

The number of instances of the soft data that are less than or equal to an integer portion of the determined threshold are counted to yield an integer count (block 512). Interpolation is then performed on the fractional portion of the determined threshold to yield an interpolated count (block 517). This may be done by incrementing the integer portion of the determined threshold by 1, determining the number of instances of the soft data that are less than or equal to the incremented integer portion of the determined threshold, and then multiplying the determined number of instances by the fractional portion of the determined threshold. The interpolated count is added to the integer count to yield a low value count (block 522). The low value count is then divided by a total number of instances of soft data to yield a predicted bit error rate (block 527).

Figure 5C:
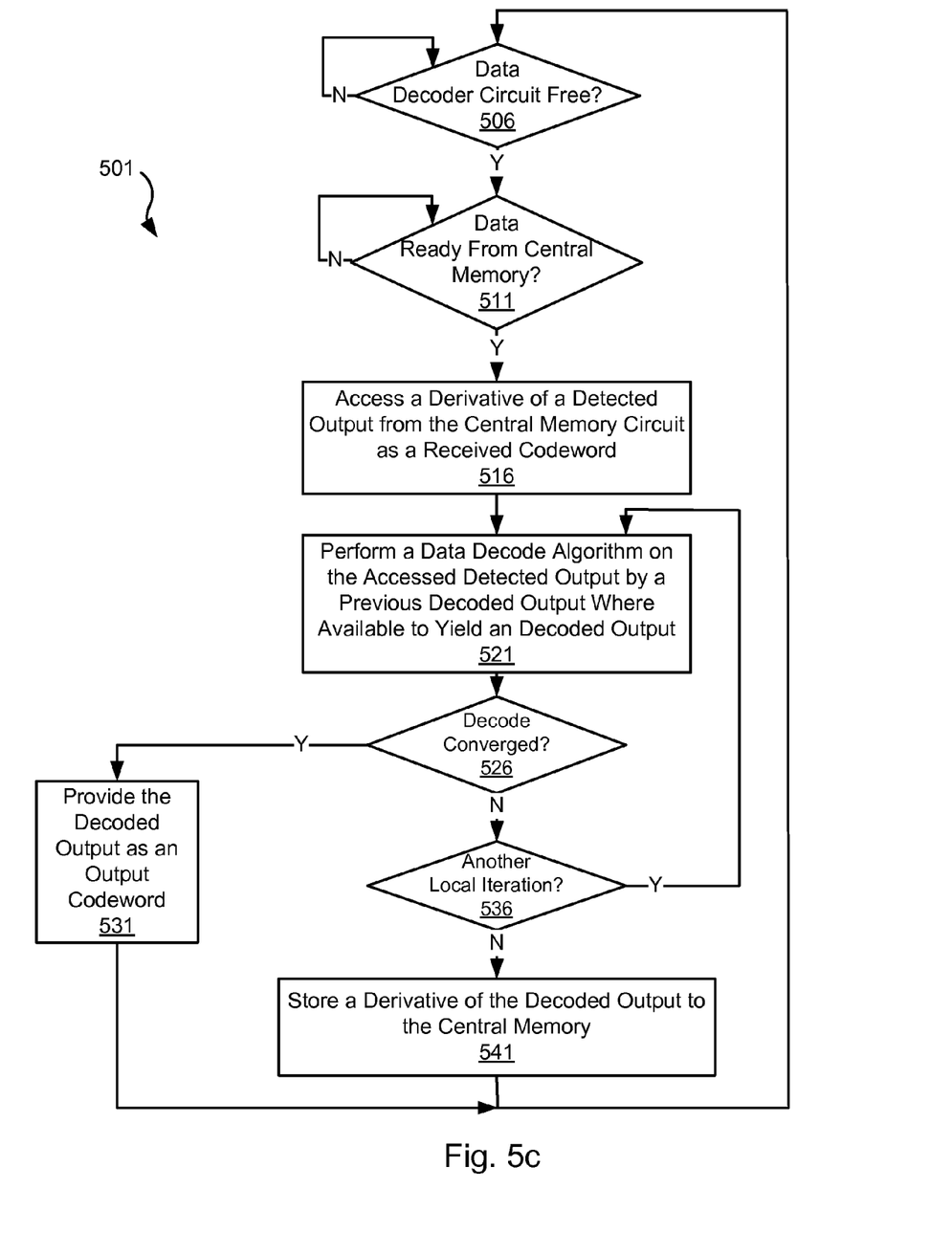

Turning to FIG. 5c, a flow diagram 501 shows a counterpart of the method described above in relation to FIGS. 5a-5b. Following flow diagram 501, in parallel to the previously described data detection process of FIG. 5a, it is determined whether a data decoder circuit is available (block 506). The data decoder circuit may be, for example, a low density data decoder circuit as are known in the art. Where the data decoder circuit is available (block 506), it is determined whether a derivative of a detected output is available for processing in the central memory (block 511). Where such a data set is ready (block 511), the previously stored derivative of a detected output is accessed from the central memory and used as a received codeword (block 516). A data decode algorithm is applied to the received codeword to yield a decoded output (block 521). Where a previous local iteration has been performed on the received codeword, the results of the previous local iteration (i.e., a previous decoded output) are used to guide application of the decode algorithm. It is then determined whether the decoded output converged (i.e., resulted in the originally written data) (block 526). Where the decoded output converged (block 526), it is provided as an output codeword (block 531). Alternatively, where the decoded output failed to converge (block 526), it is determined whether another local iteration is desired (block 536). In some cases, four local iterations are allowed per each global iteration. Based upon the disclosure provided herein, one of ordinary skill in the art will recognize another number of local iterations that may be used in relation to different embodiments of the present invention. Where another local iteration is desired (block 536), the processes of blocks 521-536 are repeated for the codeword. Alternatively, where another local iteration is not desired (block 536), and a derivative of the decoded output is stored to the central memory (block 541). The derivative of the decoded output being stored to the central memory triggers the data set ready query of block 505 to begin the data detection process.

Of note, the processes of FIGS. 5a-5c includes providing a bit error rate output based upon soft data resulting from application of the data detection algorithm. In other embodiments of the present invention, the processing of blocks 5a-5c may be modified to perform the function of block 525 based upon soft data resulting from application of the data decode algorithm of block 521.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a data detector circuit operable to apply a data detection algorithm to a data set to yield a detected output and an interim filtered output;
    a variance calculation circuit operable to calculate a variance across instances the interim filtered output;
    a data decoder circuit operable to apply a data decode algorithm to a decoder input derived from the detected output to yield a decoded output; and
    a quality based bit error rate prediction circuit operable to calculate a bit error rate output based upon a combination of the variance and a soft output.

2. The data processing system of claim 1, wherein the soft output is soft data corresponding to the detected output.

3. The data processing system of claim 2, wherein the quality based bit error rate prediction circuit comprises:
    a threshold determination circuit operable to generate a threshold value corresponding to the variance.

4. The data processing system of claim 3, wherein the threshold determination circuit is a look up table programmed with threshold values corresponding to respective values of the variance.

5. The data processing system of claim 2, wherein the quality based bit error rate prediction circuit comprises:
    a counter circuit operable to increment whenever the soft output is less than a threshold value to yield a count value.

6. The data processing system of claim 5, wherein the threshold value is an integer portion of an overall threshold value, wherein the counter circuit is a first counter circuit, wherein the count value is a first count value, and wherein the quality based bit error rate prediction circuit comprises:
    a summation circuit operable to add a value of one to the integer portion of the overall threshold value to yield an adjusted value;
    a second counter circuit operable to increment whenever the soft output is equal to the adjusted value to yield a second count value; and
    a multiplier circuit operable to multiply the second count value by a fraction portion of the overall threshold value to yield a product.

7. The data processing system of claim 6, wherein the summation circuit is a first summation circuit, and wherein the quality based bit error rate prediction circuit comprises:
    a second summation circuit operable to add the first count value to the product to yield a low value count.

8. The data processing system of claim 7, wherein the quality based bit error rate prediction circuit comprises:
    a divider circuit operable to divide the low value count by a total number of instances of the soft data.

9. The data processing system of claim 2, wherein the soft data is log likelihood ratio data.

10. The data processing system of claim 1, wherein the soft output is soft data corresponding to the decoded output.

11. The data processing system of claim 1, wherein the data detector circuit is selected from a group consisting of: a Viterbi algorithm data detector circuit, and a maximum a posteriori data detector circuit.

12. The data processing system of claim 1, wherein the data decoder circuit is a low density parity check decoder circuit.

13. The data processing system of claim 1, wherein the system is implemented as an integrated circuit.

14. The data processing system of claim 1, wherein the data processing system is incorporated in a device selected from a group consisting of: a storage device, and a data transmission device.

15. A method for data processing, the method comprising:
    applying a data detection algorithm to a data set to yield a detected output and an interim filtered output, wherein the detected output includes soft data;
    calculating a variance across instances the interim filtered output; and
    calculating a bit error rate output by a quality based bit error rate prediction circuit based upon a combination of the variance and the soft data.

16. The method of claim 15, wherein the method further comprises:
    determining a threshold value based upon the variance; and
    incrementing a count value whenever the soft data is less than the threshold value.

17. The method of claim 16, wherein determining the threshold value comprises:
    accessing a look up table using the variance.

18. The method of claim 16, wherein the determined threshold value includes an integer portion of the determined threshold value and a fraction portion of the determined threshold value, wherein the count value is a first count value, and the method further comprises:
    adding a one to the integer portion of the determined threshold value to yield an adjusted value;
    incrementing a second count value whenever the soft data is equal to the adjusted value;
    multiplying the second count value by a fraction portion of the overall threshold value to yield a product; and
    adding the first count value to the product to yield a low value count.

19. The method of claim 18, wherein the method further comprises:
    dividing the low value count by a total number of instances of the soft data to yield a predicted bit error rate.

20. A storage device, the storage device comprising:
    a storage medium;
    a head assembly disposed in relation to the storage medium and operable to provide a sensed signal corresponding to information on the storage medium;
    a read channel circuit including:
    an analog to digital converter circuit operable to sample an analog signal derived from the sensed signal to yield a series of digital samples;
    an equalizer circuit operable to equalize the digital samples to yield a data set;
    an input buffer operable to maintain at least the data set;
    a data detector circuit operable to apply a data detection algorithm to the data set to yield a detected output and an interim filtered output;
    a variance calculation circuit operable to calculate a variance across instances the interim filtered output;

a data decoder circuit operable to apply a data decode algorithm to a decoder input derived from the detected output to yield a decoded output;

a quality based bit error rate prediction circuit operable to calculate a bit error rate output based upon a combination of the variance and a soft output.

\* \* \* \* \*